US008526926B2

(12) United States Patent
Selph et al.

(10) Patent No.: US 8,526,926 B2
(45) Date of Patent: Sep. 3, 2013

(54) COMMUNICATION MANAGEMENT FEATURES

(71) Applicant: TIP Solutions, Inc., Buffalo Grove, IL (US)

(72) Inventors: Douglas Scott Selph, Chicago, IL (US); Mark Dyer, Berkshire (GB); Enrique J. Wong, San Jose, CA (US); Kenneth F. Wolfinger, Skokie, IL (US); Charles M. Kellerhals, Gurnee, IL (US); Bradley T. Kranz, Slingerlands, NY (US); Daniel Patrick Guigley, Woodinville, WA (US); John T. Braun, Vernon Hills, IL (US); Lars S. Sorensen, Algonquin, IL (US); Jason D. Shah, Chicago, IL (US)

(73) Assignee: TIP Solutions, Inc., Buffalo Grove, IL (US)

( * ) Notice: Subject to any disclaimer, the term of this patent is extended or adjusted under 35 U.S.C. 154(b) by 0 days.

(21) Appl. No.: 13/629,820

(22) Filed: Sep. 28, 2012

(65) Prior Publication Data

US 2013/0039482 A1  Feb. 14, 2013

Related U.S. Application Data

(63) Continuation of application No. 12/948,424, filed on Nov. 17, 2010, now Pat. No. 8,301,129.

(60) Provisional application No. 61/346,790, filed on May 20, 2010, provisional application No. 61/261,902, filed on Nov. 17, 2009.

(51) Int. Cl.
*H04W 4/16* (2009.01)

(52) U.S. Cl.
USPC ............... 455/415; 455/414.1; 455/550.1; 379/67.1; 379/201.02

(58) Field of Classification Search
USPC ............... 455/415, 414.1, 550.1; 379/210, 379/201.02, 67.1
See application file for complete search history.

(56) References Cited

U.S. PATENT DOCUMENTS 6,219,414 B1   4/2001   Maciejewski et al.
6,393,272 B1   5/2002   Cannon et al.
6,430,269 B1   8/2002   Kanerva
(Continued)

FOREIGN PATENT DOCUMENTS

KR   10-2006-0129762 A   12/2006

OTHER PUBLICATIONS

Mason Inman, Welcome to the Open Source Cellphone, http://www.tmcnet.com/usubmit/2006/03/10/1447852.htm, Mar. 10, 2006.

(Continued)

*Primary Examiner* — David Q Nguyen
(74) *Attorney, Agent, or Firm* — Levenfeld Pearlstein, LLC

(57) ABSTRACT

A method for answering a communication includes the steps of receiving an incoming communication sent by a sender and intended for a communication device of a recipient and answering the communication with an injected audio, video, text, and/or graphic message. The injected message indicates to the sender, in effect, that the recipient is presently unable to respond to the communication but is or will be made aware of the communication. The method further includes the step of providing a promise fulfillment feature that alerts the recipient to the communication and any promise to follow-up with the sender made in the injected message.

16 Claims, 7 Drawing Sheets

(56) References Cited

U.S. PATENT DOCUMENTS

| | | |
|---|---|---|
| 6,470,196 B1 | 10/2002 | Yamashita |
| 6,574,471 B1 | 6/2003 | Rydbeck |
| 6,633,634 B1 | 10/2003 | Crocket et al. |
| 6,654,615 B1 | 11/2003 | Chow et al. |
| 6,728,558 B1 | 4/2004 | Kubo et al. |
| 6,738,467 B1 | 5/2004 | Infosino |
| 6,760,581 B2 | 7/2004 | Dutta |
| 6,768,789 B1 * | 7/2004 | Wilk .................. 379/67.1 |
| 6,782,252 B1 | 8/2004 | Kang et al. |
| 6,829,343 B2 | 12/2004 | Maciejewski et al. |
| 6,850,604 B2 | 2/2005 | Cannell et al. |
| 6,975,709 B2 | 12/2005 | Wullert |
| 7,006,618 B1 | 2/2006 | Shaffer et al. |
| 7,010,288 B2 | 3/2006 | Brown et al. |
| 7,139,383 B2 | 11/2006 | Maciejewski et al. |
| 7,231,232 B2 | 6/2007 | Osann, Jr. |
| 7,254,226 B1 | 8/2007 | Roberts et al. |
| 7,330,721 B2 | 2/2008 | Bhatia et al. |
| 7,388,952 B2 | 6/2008 | Maciejewski et al. |
| 7,391,859 B2 | 6/2008 | Crockett et al. |
| 8,301,129 B2 * | 10/2012 | Selph et al. .................. 455/415 |
| 2002/0061097 A1 | 5/2002 | Kanerva |
| 2003/0054865 A1 | 3/2003 | Byers et al. |
| 2003/0063732 A1 | 4/2003 | Mcknight |
| 2003/0100261 A1 | 5/2003 | Gusler et al. |
| 2003/0153364 A1 | 8/2003 | Osann, Jr. |
| 2003/0190028 A1 | 10/2003 | Maciejewski et al. |
| 2004/0137883 A1 | 7/2004 | Crockett et al. |
| 2004/0203794 A1 | 10/2004 | Brown et al. |
| 2004/0214553 A1 | 10/2004 | Kang et al. |
| 2005/0147212 A1 | 7/2005 | Benco et al. |
| 2007/0099651 A1 | 5/2007 | Strasser |
| 2007/0213100 A1 | 9/2007 | Osann, Jr. |
| 2008/0076395 A1 | 3/2008 | Bhatia et al. |
| 2008/0146199 A1 | 6/2008 | Horodezky et al. |
| 2008/0205619 A1 | 8/2008 | Kalaboukis et al. |
| 2008/0304637 A1 | 12/2008 | Ganganna |
| 2009/0010415 A1 | 1/2009 | Ustby |
| 2009/0122967 A1 | 5/2009 | Loisch et al. |
| 2010/0330966 A1 | 12/2010 | Higuchi et al. |

OTHER PUBLICATIONS

International Search Report and the Written Opinion of the International Searching Authority issued on Jul. 28, 2011 in connection with PCT/U62010/057064.

* cited by examiner

COMMUNICATION MANAGEMENT FEATURES

CROSS REFERENCE TO RELATED APPLICATIONS

This application claims the benefit of U.S. Provisional Application No. 61/261,902, filed Nov. 17, 2009, and U.S. Provisional Application No. 61/346,790, filed May 20, 2010, each of which is incorporated by reference herein in its entirety.

BACKGROUND OF THE INVENTION

1. Field of the Invention

The present invention is directed to communication management features that provide options for screening, responding to, and/or otherwise processing incoming communications.

2. Background of the Invention

Devices capable of sending and receiving communications, such as phone calls, text messages, electronic mail, instant messaging requests, and other electronic updates and information are becoming increasingly prevalent. Such devices come in a wide variety and may be generally stationary, such as a desktop computer, TV/Set-Top box, static game console, etc., or may be easily portable, such as a smart phone, tablet computer, notebook computer, personal digital assistant ("PDA"), portable game console, portable media device, etc. Further, such devices may send and receive communications through a wide variety of wired or wireless connections, standards, or protocols, such as the Internet, an intranet, voice over interact protocol ("VOIP"), satellite, 3G, SMS, MMS, 4G, WIMAX, etc.

Recipients have various options as to how the will receive, be notified of, respond, and otherwise process incoming communications. Referring generally to a phone call sent to a recipient's device, the recipient's options for responding include, for example, answering the call, ignoring the call, and forwarding the call to a voicemail system.

In some situations, such as if a recipient is in an important meeting or is already talking to someone on the other line, the recipient is notified of an incoming communication but is presently unable or unwilling to answer or respond to the communication. Consequently, the sender of the communication may attempt to contact the recipient through other channels, such as by calling a different phone number, like a cell phone, business line, and/or home number, by emailing or sending a text message, and/or by attempting to visit the recipient in person. It would be convenient in these and other situations to be able to inform the sender that the recipient has received the attempted communication but cannot currently respond, much like the function of a human secretary or receptionist when receiving a call intended for another recipient. Having a human assistant that receives and screens communications is suitable in some situations, such as in office settings during business hours on a recipient's work line. However, it is not generally feasible or practical for most users to have an assistant that manages communications on their personal devices on demand at all times.

Consequently, there is a need for communication management features that facilitate screening of incoming communications, acknowledging receipt of the communication, notifying a sender of the recipient's status, and/or otherwise providing additional options for responding to and processing communications.

SUMMARY OF THE INVENTION

According to one example, a method for answering a communication includes the steps of receiving an incoming communication sent by a sender and intended for a communication device of as recipient and answering the communication with an injected audio, video, text, and/or graphic message. The injected message indicates to the sender, in effect, that the recipient is presently unable to respond to the communication but is or will be made aware of the communication. The method further includes the step of providing as promise fulfillment feature that alerts the recipient to the communication and any promise to follow-up with the sender made in the injected message.

According to another example, a software system stored in a computer-readable medium for answering communications includes a first routine that receives an incoming communication sent by a sender and intended for a communication device of a recipient and a second routine that answers the communication with an injected audio, video, text, and/or graphic message. The injected message indicates to the sender, in effect, that the recipient is presently unable to respond to the communication but is or will be made aware of the communication. The software system also includes a third routine that provides a promise fulfillment feature that alerts the recipient to the communication and any promise to follow-up with the sender made in the injected message.

According to a further example, a system for answering communications includes means for receiving an incoming communication sent by a sender and intended for a communication device of a recipient and means for answering the communication with an injected audio, video, text, and/or graphic message. The injected message indicates to the sender, in effect, that the recipient is presently unable to respond to the communication but is or will be made aware of the communication. The system further includes means for providing a promise fulfillment feature that alerts the recipient to the communication and any promise to follow-up with the sender made in the injected message.

These and other features and advantages of the present invention will be apparent from the following detailed description, in conjunction with the appended claims.

BRIEF DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DETAILED DESCRIPTION

Figure 1:
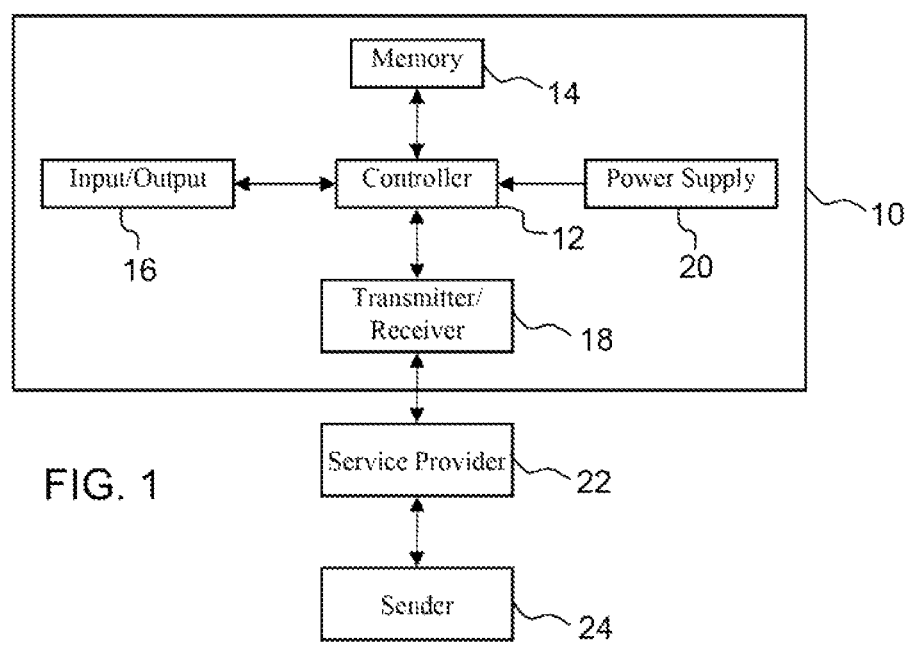
FIG. 1 illustrates a block diagram of a system according to one embodiment of the present disclosure through which communication management features may be implemented.

While the present invention is susceptible of embodiment in various forms, there is shown in the drawings and will hereinafter be described one or more embodiments with the understanding that the present disclosure is to be considered illustrative only of the invention and is not intended to limit the invention to any specific embodiment disclosed herein.

The present disclosure is directed to one or more communication management features that allow a recipient of a communication to provide an instant response and acknowledgement to a sender and to convey to the sender pertinent information. When communications, such as phone calls, text messages, including messages sent using the short message service ("SMS") and the multimedia messaging service ("MSM"), electronic mail, instant messaging requests, and electronic updates from social networking sites, news services, weather stations, financial services, travel agencies, etc., are sent a recipient's communication device, the recipient of the communication generally has several response options. The recipient may answer the communication or allow the communication to be sent to a storage location, such as a voicemail service provided by a service provider, an answering machine, a text or email inbox, etc.

According to the present disclosure, the recipient of the communication also has an option to activate a feature to perform an audio, video, text, and/or graphic message injection. In such message injection, one or more audio, video, graphic, and/or text files or messages stored locally on or remotely from the communication device can be injected into or routed via a communication channel, such as a voice and or data channel, to the sender. According to one embodiment, the recipient takes affirmative action to perform the message injection, thus, the sender is assured immediately that the recipient is aware that the sender is attempting to communicate with the recipient. Further, the audio, video, graphic, and/or text file(s) injected may include information regarding the recipient's status and availability for answering communications. For example, the injected message may inform the sender that they are going to be placed on hold until the recipient can relocate to a more convenient location to answer the communication.

The message injection may also be provided automatically without requiring affirmative action by the user as each communication is received. One scenario where such an automatic message injection is contemplated is where the device is turned off or otherwise disconnected from necessary communication channels. In one example, a communication management feature is executed on an application server, as will be described in more detail hereinafter. The communication management feature executed by the application server injects a message to the sender that acknowledges the attempted communication and conveys pertinent information, such as that the recipient's device is currently off of the network.

The present disclosure is also directed to a promise fulfillment feature that provides a log of communications that were attempted or actually sent and received and reminders for the intended recipient to follow-up with specific senders. For example, if a message injection is sent to a sender that the recipient is presently unable to respond but will do so as soon as convenient, the promise fulfillment feature will provide log of the attempted communication and a reminder to call, text, and/or email the sender.

In addition, a screening feature is also disclosed, wherein communications are screened for communication type and sender information, such that the recipient is notified only of specific communications according to customizable user preferences.

The present communication management features can be used to facilitate various additional functionalities for a communication device. The present disclosure will hereafter describe some such functionalities; however, it is contemplated that the ability to inject audio, video, text, and/or graphic messages will give rise to a great many applications, all of which are within the spirit and scope of present disclosure.

FIG. 1 illustrates typical components of a communication device 10, such as a desktop computer, TV/Set-Top box, static or portable game console, smart phone, tablet computer, PDA, portable media device, and the like, that is capable of sending and/or receiving communications. In FIG. 1, the device 10 includes a controller 12 that is coupled to a memory 14, any number of input and output ("I/O") devices or components 16, and a transmitter and/or receiver 18. In addition, the device 10 includes a power supply 20, such as a rechargeable battery or a connection to an electrical outlet, to supply power to the various components of the device.

In one non-limiting example, the device 10 is a smart phone capable of sending and receiving communications. In the present example, the controller 12 controls the receipt and processing of such communications, among other operations and functions. The memory 14 generally includes both volatile memory, such as RAM, and non-volatile memory, such as ROM and flash memory. The memory 14 stores data, such as an operating system, a communication management system, which may be implemented as a software program or application, other software applications that enable receipt and transmission of communications and other features such as calendars, email, browsers, word processing programs, games, and the like, communications sent to the device, etc. The memory 14 also stores caller or sender identification information, such as names associated with phone numbers, email addresses, company or work information, addresses, and the like. Such sender identification information may be used to identify allowed senders and communications, as will be described in more detail hereinafter.

Further, the I/O devices 16 may include, without limitation, a display, speaker, microphone, keypad, touch panel, indicator lights, vibration motor, and the like, as would be apparent to one of ordinary skill. The transmitter/receiver 18 includes known components for transmitting and receiving communications over an known wired or wireless connection, standard, or protocol, such as the Internet, an intranet, VOIP, satellite, 3G, SMS, MMS, 4G, WIMAX, etc. In other embodiments, the device 10 may include additional or fewer components, the operation of which would be apparent to one of ordinary skill in the art.

FIG. 1 further illustrates a general interaction between the device 10, a service provider 22, and a sender 24. Generally, communications along with other commands and data, for example, sender identification information, can be sent to the device 10 from the service provider 22 or from the sender 24 through the service provider. As will be described in more detail hereinafter, the device 10 and/or the service provider 22 may be configured to implement features that manage communications sent to the device.

Figure 2:
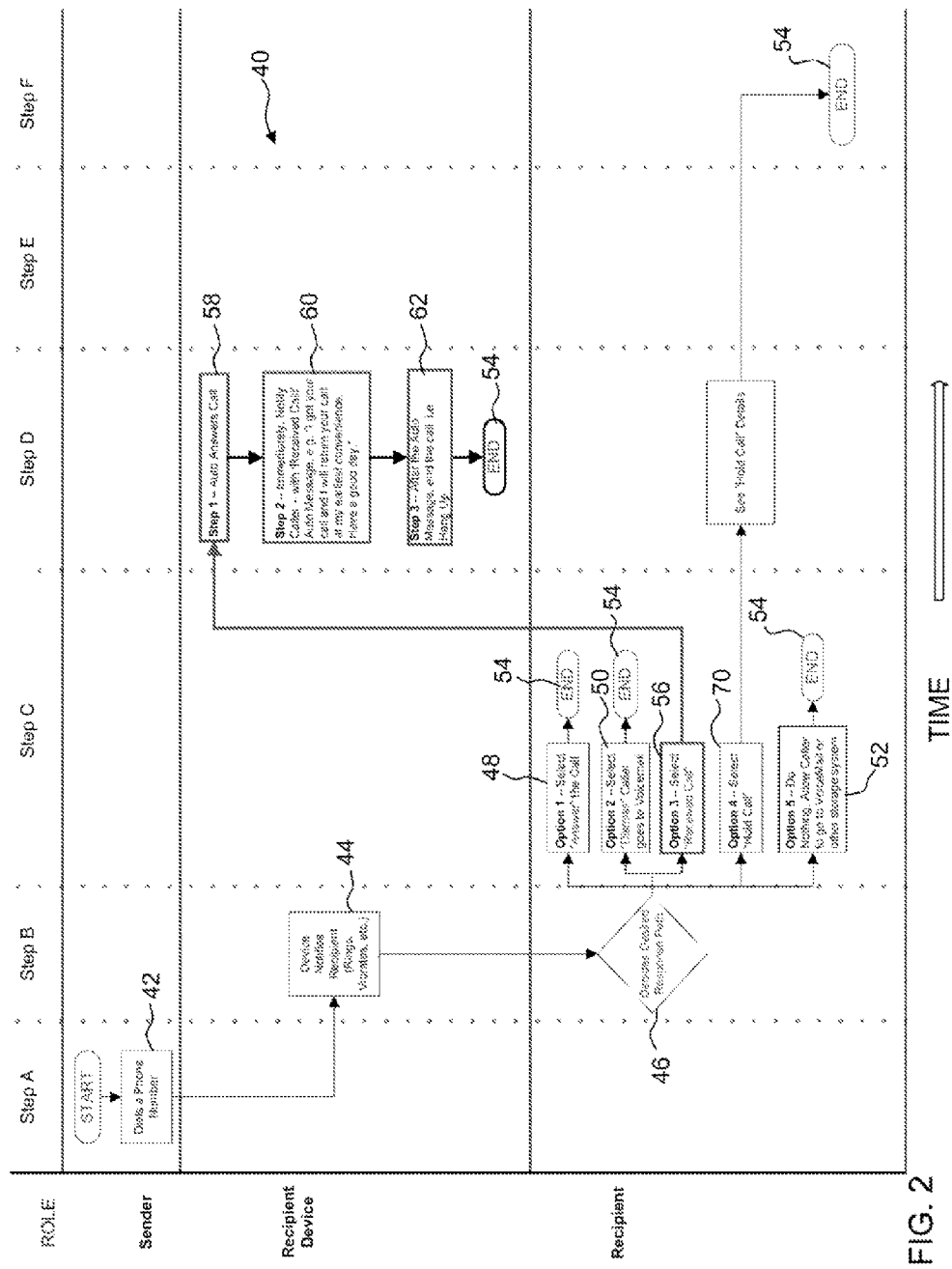
FIG. 2 is a flowchart according to one embodiment detailing communication management features that may be implemented through the device of FIG. 1.

FIG. 2 illustrates a communication management process 40 that provides features for user customizable message injection in response to incoming communications of any type, such as a phone call, a text message, an email, etc. The process 40 may be implemented by hardware and/or software components of the device 10 of FIG. 1. In one example, one or more portions of the process 40 may be implemented as a software program or application that can be downloaded by a user onto the device 10. For example, the software application may be available for user download on an online software store, such as Android Market, Apple's App Store, Nokia's Ovi Store, Blackberry's App World, Windows Marketplace, etc. Alternatively, the software program can be incorporated into the device 10 by a manufacturer.

For reference purposes only, the process 40 will be described in detail in the context of a phone call, it being understood that the process could be adapted to manage any type of communication, such as a text message, an email, and the like. The process 40 begins at a block 42, during which a sender, such as a human user or an automated computer, transmits a communication to a recipient's device 10, for example, by dialing the recipient's phone number. At a block 44, the device 10 receives the communication and notifies the recipient, such as with a vibration, flashing light, and/or audible ring tone. In one embodiment, the device 10 provides a graphical user interface at a block 46 to display options for the recipient to respond to the incoming communication. In the present example, five options are available to the recipient, although not all of the options may be actually represented on a display. A first option is selected at a block 48 to answer the communication in any known manner. Another option is selected at a block 50 to immediately dismiss the communication and allow the communication to go to a storage location, such as a voicemail, text message, or email inbox, for example. Yet another option represented by the block 52 is to do nothing and allow the communication to go to the storage location.

After each of the blocks 48-52, control passes to an end block 54, which represents the termination of steps from the perspective of the present process 40. However, other processes may be performed after any of the end blocks 54 illustrated in FIG. 2, such as allowing the recipient to respond to the communication, ending the notification of the communication, forwarding the communication to an appropriate inbox, disconnecting the communication channel between the sender and the recipient device, proceeding to a promise fulfillment feature, etc.

The present process 40 also allows for additional options, including a block 56, which represents the selection of a fourth option to answer the communication by sending an injected message to the sender, such as a recorded audio message stating: "I received your communication and I will return your communication soon." In the context of a phone call, the fourth option may be considered a "Received Call" option. In one example, the block 56 may only be provided as an option to the recipient if the sender's information, e.g., name, phone number, email address, etc., are identified and if the "Received Call" option is applicable to or enabled for the identified sender. More particularly, the sender's information may be extracted from the communication in a known manner, compared to stored contact information, and associated with settings of the communication management features disclosed herein. However, in another example, the "Received Call" option may be provided for all senders regardless of whether they known or unknown.

After the option is selected at the block 56, the communication is automatically answered at a block 58 and the sender is provided with acknowledgement that the communication was received with the injected message at a block 60. The injected message may be a default message or a customized message associated with the identified sender, as will be described in more detail hereinafter. After injecting or relaying the message, which is generally but not always a pre-recorded message, the communication device may end the communication link at a block 62. Consequently, the sender knows that the recipient has been notified and is aware of the communication and there is no need to attempt to contact the recipient through other channels or to leave a voicemail message.

Various modifications can be made to the "Received Call" feature without departing from the spirit of the present disclosure. For example, the block 58 may inject an audio message to inform the sender that the feature is active, such as a message stating "Your communication is being answered by the Received Call feature." In addition, the block 62 may provide the sender the option of leaving a voicemail message, if desired. In another example, the blocks 46, 56 allow the user to select a specific message to be injected to the sender. The specific message can be a default or global message, a customized message, or one or more quick messages. Examples of quick messages may include, "I'm at lunch with customers. I'll call you back when I'm free," "I'm driving and will call you back when I can pull over," and "I'm in a meeting. I'll call you back shortly." Further, control may proceed from the end block 54 following the block 62 to a promise fulfillment feature, as will be described in more detail hereinafter.

Figure 3:
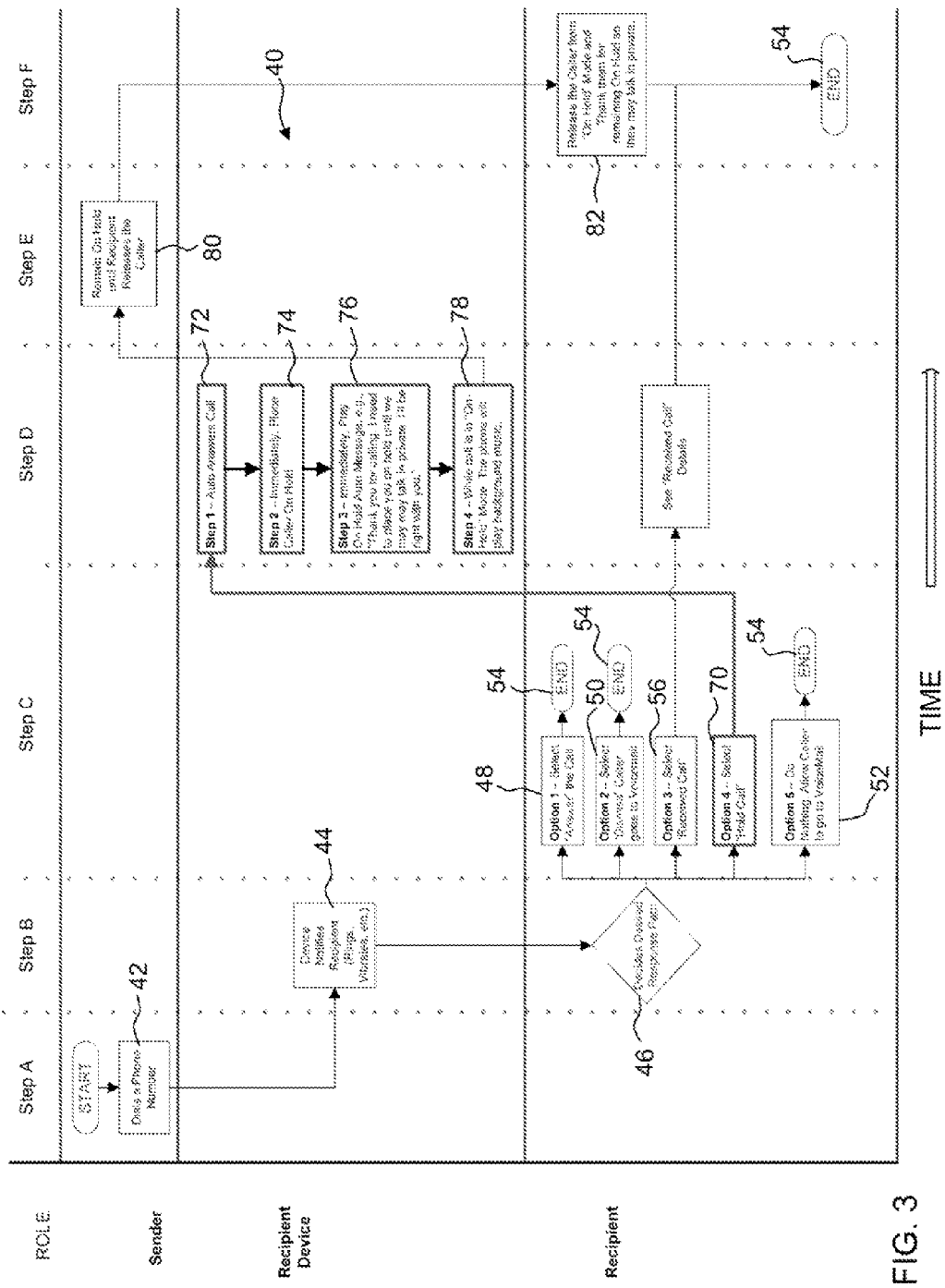
FIG. 3 is a flowchart illustrating further details of the communication management features of FIG. 2.

FIG. 3 illustrates further details of the flowchart 40 of FIG. 2. More particularly, in FIG. 3, the recipient is able to select another option represented by a block 70. In the context of a phone call, the option of the block 70 may be considered a "Hold Call" option. In one example, the block 70 may only be provided as an option to the recipient if the sender's information, e.g., name, phone number, email address, etc., are identified and if the "Hold Call" option is applicable to or enabled for the identified sender. As described above, the sender's information may be extracted from the communication in a known manner, compared to stored contact information, and associated with settings of the communication management features disclosed herein. However, in another example, the "Hold Call" option may be provided for all senders regardless of whether they known or unknown.

In the present embodiment, the communication is answered at a block 72 and the caller is placed on hold at a block 74. At a block 76, an audio, video, text, and/or graphic file is injected into the communication channel indicating that the caller has been placed on hold in order for the recipient to move to a more appropriate area for speaking. Such a file may include, for example, an audio file stating: "Thank you for calling. I need to place you on-hold until I move to an area where I may speak freely. I will be with you in a moment." In one embodiment, at a block 78, while the caller is on hold, a personal message, music, or other background entertainment may be played, again via audio, video, text, and/or graphic injection. The injected message of the blocks 76 and/or 78 may be a default message or a customized message associated with the identified sender, as will be described in more detail hereinafter. At a block 80, the caller continues to remain on-hold until the recipient releases the caller and/or answers at a block 82. Thereafter, control passes to a block 54 and the recipient and caller may communicate and terminate the call when the communication is complete.

Like the "Received Call" feature above, various modifications can be made to the "Hold Call" feature without departing from the spirit of the present disclosure. For example, the block 72 may inject an audio message to inform the sender that the feature is active, such as a stating "Your communication is being answered by the Hold Call feature." In addition, the block 80 may provide the sender the option of leaving a voicemail message, if desired. In another example, the blocks 46, 70 allow the user to select a specific message to be injected to the sender, such as a default or global message, a customized message, or one or more quick messages.

Figure 4:
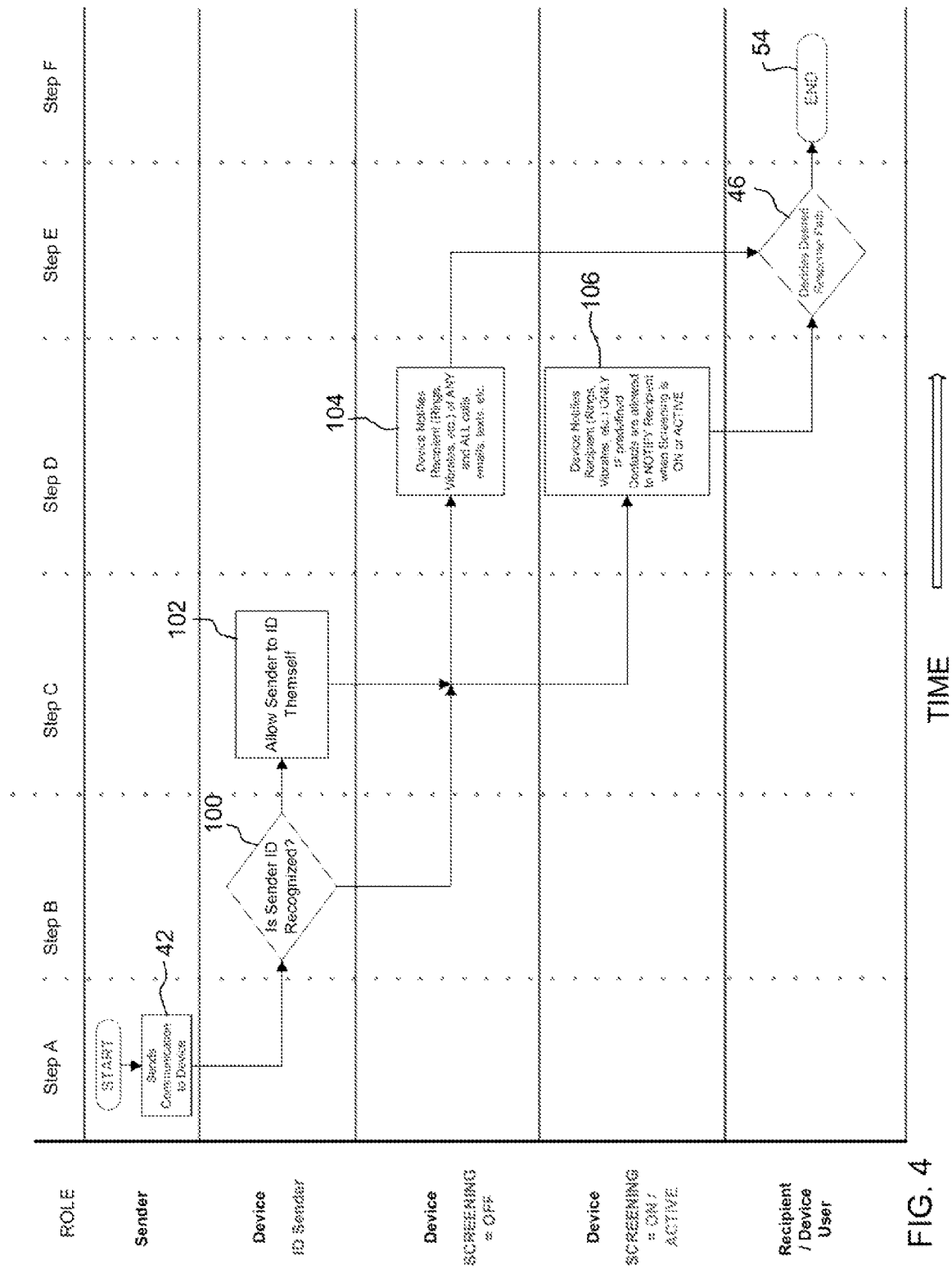
FIG. 4 is a flowchart illustrating another communication management feature that may be implemented independently or in combination with the features of FIGS. 2 and 3.

FIG. 4 illustrates another communication management feature that can be incorporated into the processes of FIGS. 2 and 3, for example. More particularly, after a sender sends a communication to the recipient's device, a determination is made at a block 100 whether the sender's identification information, e.g., name, phone number, email address, etc., are recognized, which in one example is accomplished by matching the senders identification information to stored contacts. If the sender is not recognized, control passes to a block 102 and the sender is provided with the option to identify himself or herself, such as by speaking their name, which can be converted to text and displayed to the recipient. Following the blocks 100 and 102 a determination is made whether a screening feature is active or not. If the screening feature is not active, control passes to a block 104 and the device 10 notifies the recipient of the communication. If the screening feature is active, control passes to a block 106 and the device 10 notifies the recipient of the communication only if the incoming communication is from an approved sender list. If not, the sender and/or the communication is sent to voicemail, for example, or otherwise discarded, stored, and/or added to a communication log. In one example of the block 106, if the sender's identification is not recognized at the block 100 but the sender speaks her name, which does match to an approved sender, the device 10 will notify the recipient. Such a situation may arise, for example, if the sender is calling from an unknown phone number but their name is on an approved list.

Thereafter, control passes to the block 46, which is the same block from FIGS. 2 and 3, and the recipient has a number of options for responding to the communication, including performing a message injection, as described herein. Further details of the screening feature of FIG. 4 are described in more detail in U.S. patent application Ser. No. 12/947,666, filed on Nov. 16, 2010, which is hereby incorporated by reference in its entirety.

Figure 5A:
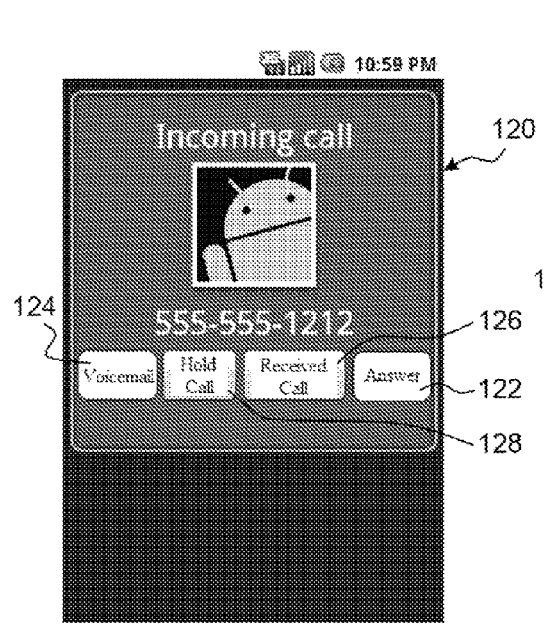
FIGS. 5A-5D are non-limiting examples of screen shots that may be displayed to a user, for example, on the device of FIG. 1, to display response options and to modify settings utilized by the communication management features disclosed herein.

Referring now to FIG. 5A, an example of the blocks 44, 46 described above is illustrated, wherein the device 10 notifies the recipient of an incoming call on a display 120, which also displays buttons 122, 124, 126, and 128, which represent the response options 48, 50, 54, and 70, respectively. In the present example, the recipient views the incoming call information, which typically displays a phone number, a name of the sender, a picture of the sender, and/or other identification information, and makes a response decision by selecting one of the buttons 120-126.

Figure 5B:
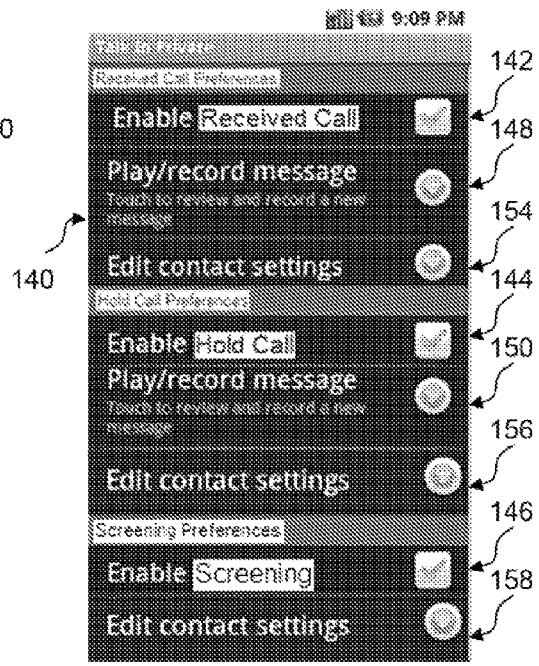
Figure 5C:
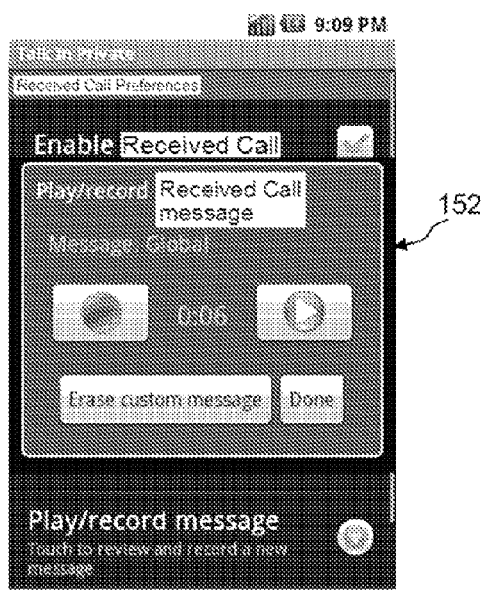
Figure 5D:
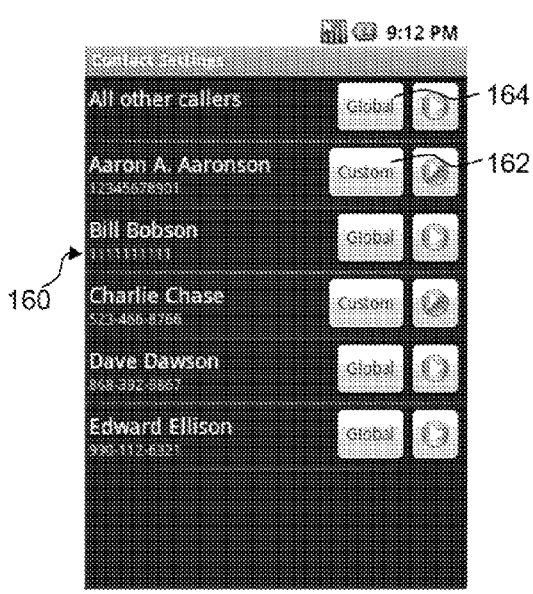

FIGS. 5B-5D illustrate examples of screenshots showing how a user or recipient can modify various settings of the communication management features disclosed herein. The screenshots of FIGS. 5B-5D can be screenshots from a software application executed on the device 10 or from a website provided by the service provider 22, for example. If FIGS. 5B-5D are implemented as a website, a user may be required to login to the website before accessing the feature settings, as would be apparent to one of ordinary skill.

More particularly, FIG. 5B illustrates a screen 140 that includes various touch screen buttons allowing the user to modify settings of the features. For example, the screen 140 includes buttons 142, 144, 146 to enable or disable the "Received Call" feature, the "Hold Call" feature, and screening feature, respectively. The buttons 142, 144, 146 may be used simply to turn enable and disable the respective features, however, in one embodiment, the buttons 142-146 also allow the user to enable the features for a specific length of time before being automatically disabled and/or to synchronize the features with an electronic calendar available through the device. For example, if the user sets one or more of the features to be active for the next 2 hours, then the device's electronic calendar may automatically block off the next two hours and indicate that the user is unavailable or not receiving communications. Another option allows the user to modify the electronic calendar directly, for example, to schedule a meeting for the next two hours, which then synchronizes with the communication management system and turns on one or more of the "Received Call," the "Hold Call," and the screening feature for the same time period. In yet another embodiment of the buttons 142-146, the user can select preset and customizable time period categories. For example, the user can set a bedtime category between 11:00 pm and 7:00 am during which only calls from the emergency group are allowed. Other categories, for example, may include a weekly status meeting category, a working out category, a meal time category, a family time category, etc.

There are also buttons 148, 150 that allow a user to edit the audio, video, graphical, and/or text files or messages injected to senders during the "Received Call" and the "Hold Call" features, respectively. FIG. 5C illustrates an example of a screen 152 that allows a user to modify an audio message that is injected to the sender during the "Received Call" function. The screen 152 illustrates an example where a user can record a global or default message. In other examples, the user can record a customized message to select users and/or record quick messages. The user may modify messages injected during the "Hold Call" function in the same manner as FIG. 5C.

The screen 140 also provides buttons 154, 156, 158 to allow a user to edit contact settings for the "Received Call," the "Hold Call," and the screening features, respectively. Such contact settings are illustrated, for example, on a screen 160 of FIG. 5D and include the ability to set a custom 162 or global 164 message injection to select contacts or senders. The contact settings also include the ability to designate allowed and non-allowed contacts for the screening feature. Other contact settings include, for example, the ability to define customized groups or categories, such as "friends," "family," "work," etc. and to customize settings for each group or category.

Figure 6:
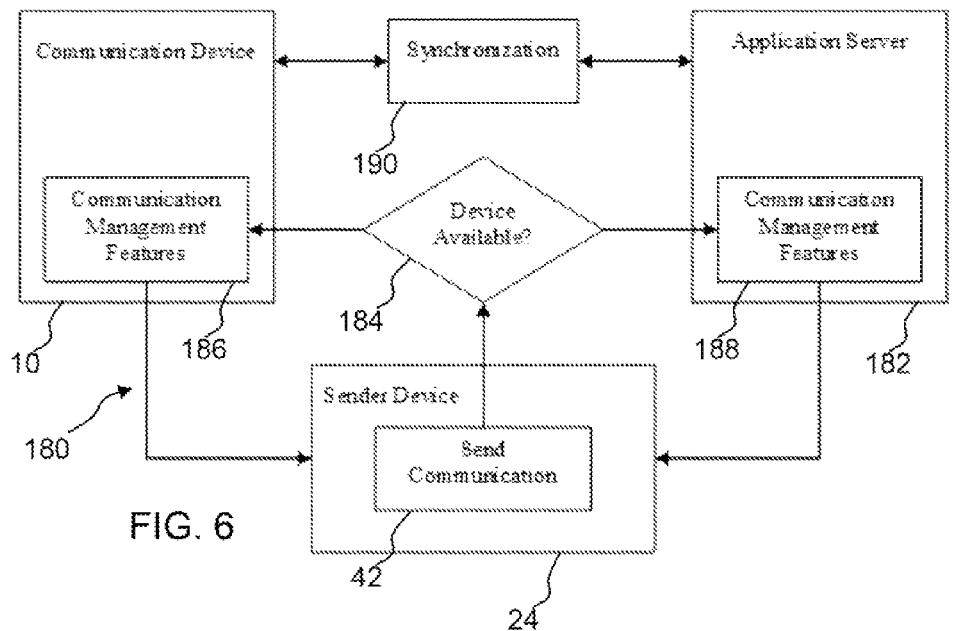
FIG. 6 is a flowchart illustrating details of yet another communication management feature that may be implemented independently or in combination with the features of FIGS. 2-4.

FIG. 6 illustrates another flowchart 180 of how an application server 182 may implement one or more of the communication management features disclosed herein. The application server may be implemented separately from the recipient's device 10, such as on the recipient's personal computer, a communication enabled car, plane, or other vehicle, or by a network carrier, such as a cellular service carrier, as VOIP provider, and/or cable or satellite communications provider, fix example. More particularly, after a sender sends a communication intended for the recipient's communication device 10 at the block 42, a decision block 184 determines whether the device 10 is available or not. The availability of the device 10 may be based on any number of factors or situations, such as if the device 10 turned off or otherwise disconnected from a communication network, if the device is presently processing another communication, if the user has selected an option to direct the call directly to the application server 182, and the like. If the device 10 is available, control passes to a block 186, which represents any one or more of the communication management features disclosed by FIGS. 2-4, for example, and the communication is processed accordingly by the device. If the device 10 is not available, control passes to a block 188, which represents communication management features executed by the application server 182.

In one example, the block 188 includes an automatic "Received Call" feature that functions similarly to the "Received Call" feature of FIG. 2. In the automatic "Received Call" feature, the application server 22 is notified that the device 10 is unavailable and performs steps similar to the blocks 58-62 of FIG. 2. More particularly, the application server 182 may answer the call, inject a message that the recipient is currently unavailable but will follow-up with the sender as soon as convenient, and then terminate the communication link. As in the "Received Call" feature above, the automatic "Received Call" feature may only be executed if the feature is activated for the identified sender. The application server 182 stores sender information and settings for the automatic "Received Call" feature to enable the determination of whether the feature is activated for the sender or not. However, in another example, the automatic "Received Call" option may be provided for all senders regardless of whether they known or unknown.

A synchronization block 190 represents a connection between the device 10 and the application server 182 that, when available, synchronizes information, such as a contact list, voice names, customized messages, default messages, quick messages, calendars, and other feature settings, between the device 10 and the application server 182. In one embodiment, the voice names and customized messages will be stored or otherwise associated with sender identification information in the contact list so that senders can be identified in multiple ways and customized messages can be easily retrieved for the sender. The block 190 also provides a connection for the application server 182 to notify the device 10 of any communications that were received while the device 10 was unavailable. The connection of the block 190 may be provided by any suitable wired or wireless connection, such as a connection between the device 10 and a carrier's network, an Internet webpage, an intranet connection, cable, VOIP, SMS, MMS, Satellite, Bluetooth, etc.

Various modifications can be made to the automatic "Received Call" feature without departing from the spirit of the present disclosure. For example, the feature may inject an audio message to inform the sender that the feature is active, such as a stating "Your communication is being answered by the automatic Received Call feature." Further, the automatic "Received Call" feature may provide an option for the sender to leave a voicemail for the recipient, wherein the application server 182 will save the voicemail and provide the message to the recipient in any known manner.

Figure 7:
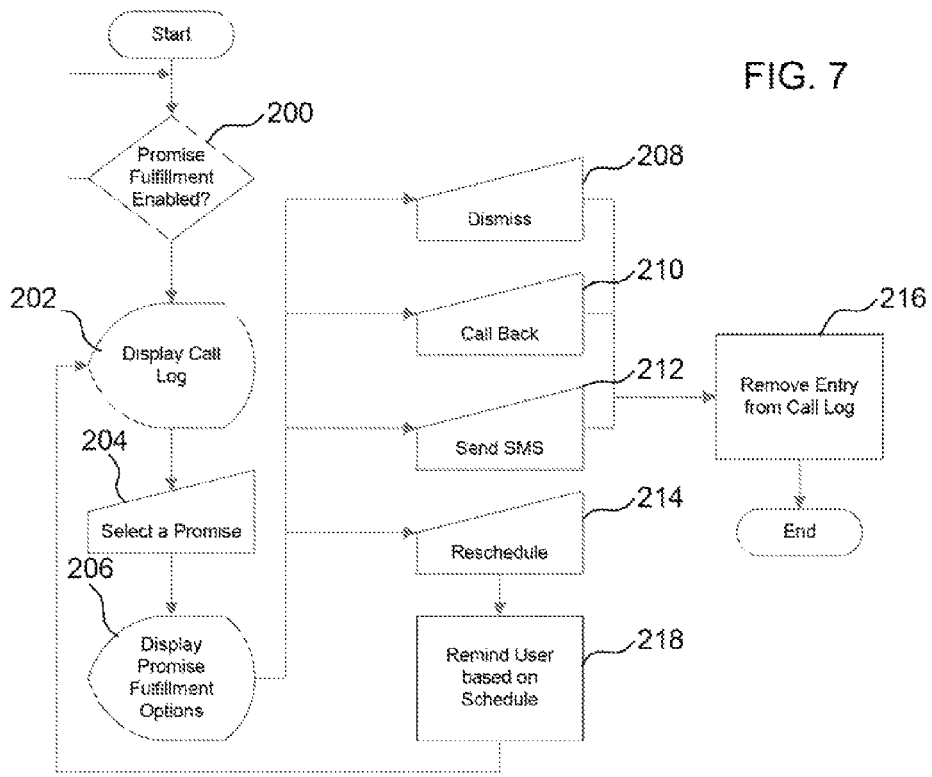
FIG. 7 is a flowchart illustrating details of a promise fulfillment feature according to one example.

In addition, one or more of the features disclosed herein may be implemented in combination with a promise fulfillment feature illustrated by FIG. 7, which begins at a decision block 200 that determines if the feature is enabled. If so, control passes to a block 202 and a call or communication log is displayed, for example, as in a display 230 of FIG. 8A. The block 202 may include a log of communications processed by the "Received Call" feature, the "Hold Call" feature, the automatic "Received Call" feature, missed communications, and/or any other communications, for example. In the context of the "Received Call" and automatic "Received Call" features, the display 230 may include communication log entries 232 that represent promises made during the message injection to follow-up with the sender. The display 230 may also include entries 234 for other received or missed calls. In one example, the missed calls include calls that were never received by the device 10 but instead were received by the application server 182 and later synchronized with the device.

After the block 202, control passes to a block 204 and the user can select a promise. Promise fulfillment options are displayed for the selected promise at a block 206, shown, for example, in a display 236 of FIG. 8B. According to one example, the fulfillment options include dismissing the promise 208, calling the sender 210, sending an SMS message to the sender 212, or rescheduling the reminder 214. If the user selects the options to dismiss 208, call 210, or text 212, control passes to a block 216 and the entry is removed from the log. If the sender selects the rescheduling option 214, shown, for example, in a display 238 of FIG. 8C, the user will be able to reschedule a reminder to follow-up with the sender. Thereafter, control loops to a block 218 and the user is reminded based on the schedule, such as by an audible alarm, a vibration, and/or a display, to follow-up with the sender.

Figure 8A:
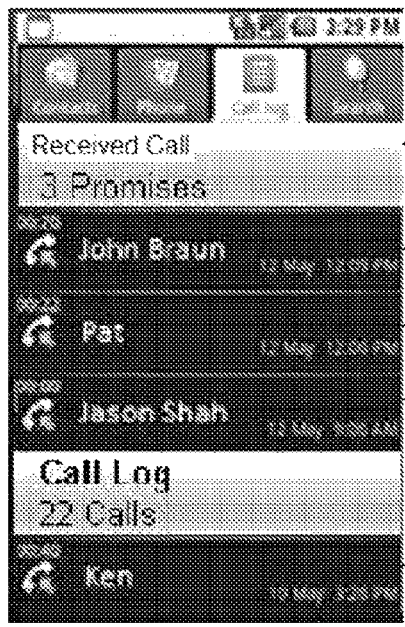
FIGS. 8A-8C are non-limiting examples of screen shots that may be displayed to a user, for example, on the device of FIG. 1, of the promise fulfillment feature of FIG. 7.
Figure 8B:
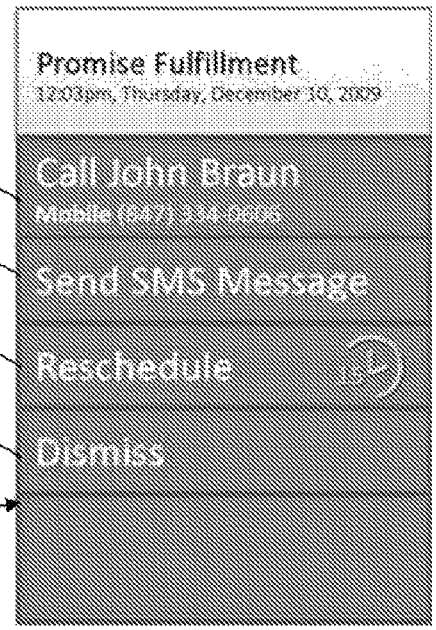
Figure 8C:
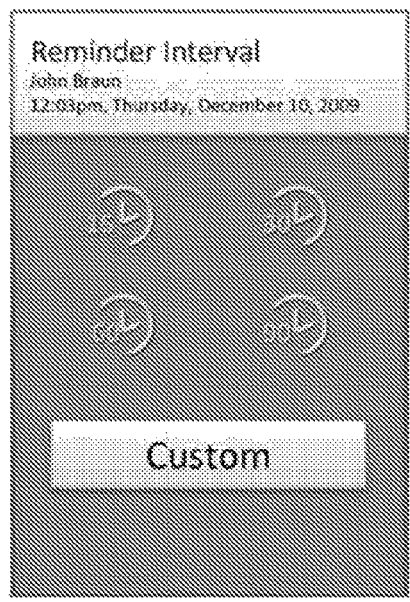

The screenshots of FIGS. 8A-8C can be screenshots from a software application executed on the device 10 or from a website provided by the service provider 22, for example. If FIGS. 8A-8C are implemented as a website, a user may be required to login to the website before accessing the feature settings, as would be apparent to one of ordinary skill.

In the present disclosure, the words "a" or "an" are to be taken to include both the singular and the plural. Conversely, any reference to plural items shall, where appropriate, include the singular.

Other embodiments include all of the various combinations of individual features of each of the embodiments or examples described herein.

In the present disclosure, the words "a" or "an" are to be taken to include both the singular and the plural. Conversely, any reference to plural items shall, where appropriate, include the singular.

INDUSTRIAL APPLICABILITY

The present disclosure provides communication management features that allow a use to screen or filter any type of communication in order to eliminate unnecessary disruptions and improve productivity. Further, the features provide options to inject a message to the sender that provides pertinent information regarding the user's ability to respond to communications. A promise management feature is also provided to assist the user in following up with senders.

Numerous modifications to the present disclosure will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A communication answering device having a processor and a memory, the processor executing a program for answering a communication, the program performing the steps of:

receiving an incoming communication request sent by a sender;

answering the communication;

placing the communication on hold;

displaying identification information of the sender and displaying options to respond to the communication, wherein the options include a received communication option and a hold communication option; and injecting an audio, video, text, and/or graphic message into a communication channel between the device and the sender, wherein the message indicates to the sender, in effect, that the recipient is presently unable to respond to the communication but is or will be made aware of the communication, wherein the step of answering the communication injects a first message if the received communication option is selected and injects a second message if the hold communication option is selected.

2. The device of claim 1, wherein the received communication option includes the steps of answering the communication with an injected message that indicates, in effect, that the recipient will follow-up with the sender at a later time, and ending the communication, further wherein the received communication option optionally includes the step of providing an opportunity for the sender to leave a voicemail message before ending the communication.

3. The device of claim 1, wherein the hold communication option includes the steps of placing the communication on hold, answering the communication with an injected message that indicates, in effect, that the sender is being placed on hold until the recipient can answer the communication, releasing the communication from being on hold, and answering the communication.

4. The device of claim 1, wherein the steps of receiving an incoming communication and answering the communication are performed by an application server.

5. The device of claim 1, wherein the steps of receiving an incoming communication and answering the communication are performed by the communication device.

6. The device of claim 1, wherein the injected message can be customized for specific senders.

7. The device of claim 1, including the step of terminating the call.

8. The device of claim 1, further comprising the step of identifying the sender and matching the sender with stored sender information in order to identify the injected message.

9. The device of claim 8, further comprising the step of providing an option for the sender to provide the sender's name for the step of identifying.

10. A communication answering device having a processor and a memory, the processor executing a program for answering a communication, the program performing the steps of:
   receiving an incoming communication request sent by a sender;
   answering the communication;
   placing the communication on hold; and
   injecting an audio, video, text, and/or graphic message into a communication channel between the device and the sender, wherein the message indicates to the sender, in effect, that the recipient is presently unable to respond to the communication but is or will be made aware of the communication;
   providing a screening feature that performs the steps of identifying a sender of the communication, identifying screening settings based on the sender, determining whether the communication is allowed in accordance with the identified settings, notifying a recipient of the communication, if the communication is allowed, and processing the communication without notifying a recipient, if the communication is not allowed.

11. A computer-readable tangible medium that stores a computer program for answering communications, comprising:
   a first routine that receives an incoming communication sent by a sender and intended for a communication device of a recipient;
   a second routine that answers the communication and places the communication on hold;
   a third routine that injects an audio, video, text, and/or graphic message into a communication channel between the recipient and the sender, wherein the message indicates to the sender, in effect, that the recipient is presently unable to respond to the communication but is or will be made aware of the communication;
   a fourth routine that displays identification information of the sender; and
   a fifth routine that displays options to respond to the communication, wherein the options include a received communication option and a hold communication option, and wherein the second routine injects a first message if the received communication option is selected and injects a second message if the hold communication option is selected.

12. The computer readable medium of claim 11, further comprising a sixth routine that provides a screening feature, which identifies the sender of the communication, identifies screening settings based on the sender, determines whether the communication is allowed in accordance with the identified settings, notifies a recipient of the communication, if the communication is allowed, and processes the communication without notifying a recipient, if the communication is not allowed.

13. The computer readable medium of claim 11, further comprising a sixth routine that terminates the call.

14. A communication device for answering communications including a memory and a processor, the device comprising:
   means for receiving an incoming communication sent by a sender and intended for a communication device of a recipient;
   means for answering the communication, and placing the communication on hold;
   means for displaying identification information of the sender and means for displaying options to respond to the communication, wherein the options include a received communication option and a hold communication option; and
   means for injecting an audio, video, text, and/or graphic message, wherein the message indicates to the sender, in effect, that the recipient is presently unable to respond to the communication but is or will be made aware of the communication,
   wherein the means for answering injects a first message if the received communication option is selected and injects a second message if the hold communication option is selected.

15. The device of claim 14, further comprising means for providing a screening feature, which identifies a sender of the communication, identifies screening settings based on the sender, determines whether the communication is allowed in accordance with the identified settings, notifies a recipient of the communication, if the communication is allowed, and processes the communication without notifying a recipient, if the communication is not allowed.

16. The device of claim 14, further including means terminating the call.

\* \* \* \* \*

UNITED STATES PATENT AND TRADEMARK OFFICE
CERTIFICATE OF CORRECTION

| | | |
|---|---|---|
| PATENT NO. | : 8,526,926 B2 | Page 1 of 1 |
| APPLICATION NO. | : 13/629820 | |
| DATED | : September 3, 2013 | |
| INVENTOR(S) | : Selph et al. | |

It is certified that error appears in the above-identified patent and that said Letters Patent is hereby corrected as shown below:

Title Page, item (72), Inventors, line 7, "Guigley," to read as --Quigley,--.

In the Specification

On column 1, line 5, below "CROSS REFERENCE TO RELATED APPLICATIONS" insert --This application is a continuation of application no. 12/948,424, filed on Nov. 17, 2010, now Pat. No. 8,301,129.--.

On column 1, line 34, "interact" to read as --internet--.

On column 1, line 36, "the" to read as --they--.

On column 2, line 6, "as" to read as --a--.

On column 2, line 11, "as" to read as --a--.

On column 3, line 41, "and or" to read as --and/or--.

On column 4, line 19, "of present" to read as --of the present--.

On column 4, line 56, "an" to read as --any--.

On column 8, line 60, "as" to read as --a--.

On column 8, line 61, "fix" to read as --for--.

On column 10, line 44, "use" to read as --user--.

Signed and Sealed this
Eleventh Day of November, 2014

Michelle K. Lee
*Deputy Director of the United States Patent and Trademark Office*